United States Patent [19]

Solhjell

[11] Patent Number: 5,377,057
[45] Date of Patent: Dec. 27, 1994

[54] METHOD AND SYSTEM FOR TAPE EDGE SENSING

[75] Inventor: Erik Solhjell, Oslo, Norway

[73] Assignee: Tandberg Data A/S, Norway

[21] Appl. No.: 861,061

[22] Filed: Mar. 31, 1992

[51] Int. Cl.$^5$ .............................................. G11B 21/02
[52] U.S. Cl. ...................................... 360/75; 360/77.01
[58] Field of Search ................... 360/75, 77.01, 77.12, 360/31, 67

[56] References Cited

U.S. PATENT DOCUMENTS

| | | | |
|---|---|---|---|
| 4,476,503 | 10/1984 | Solhjell | 360/75 |
| 4,786,984 | 11/1988 | Seeman | 360/67 |
| 4,802,030 | 1/1989 | Henry et al. | 360/75 |
| 4,977,468 | 12/1990 | Aruga et al. | 360/75 |
| 5,111,347 | 5/1992 | Ono et al. | 360/75 |

FOREIGN PATENT DOCUMENTS 0270275  6/1988  European Pat. Off. ........ G11B 5/58

Primary Examiner—Thomas E. Denion
Attorney, Agent, or Firm—Hill, Steadman & Simpson

[57] ABSTRACT

A method and system are disclosed for improved edge detection on tapes. By use of a nominal tape having a 100% output, a write head writes with a given write current onto the nominal tape and the output level is read with a read head during a calibration procedure in order to determine a reference level for the 100% nominal tape. Thereafter, when a given tape is being used, by use of the same write current, a signal is written on the given tape and is subsequently read to create a read output. That read output is compared to the reference level output derived during the calibration to create a correction factor. The correction factor is then employed to correct a trigger point utilized during a subsequent tape edge determination.

7 Claims, 7 Drawing Sheets

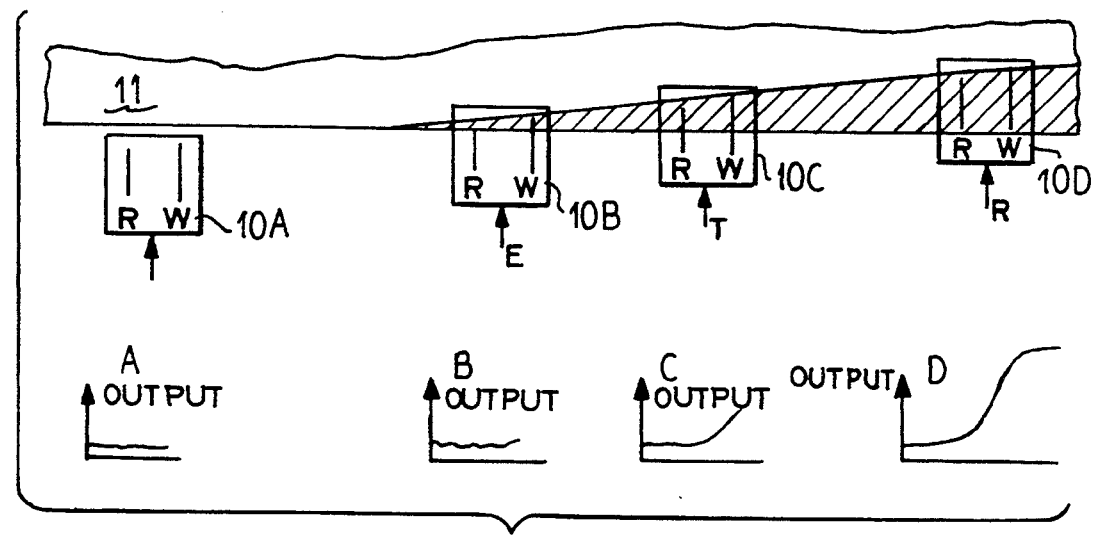
FIG. 1
(PRIOR ART)
FIG. 2
(PRIOR ART)
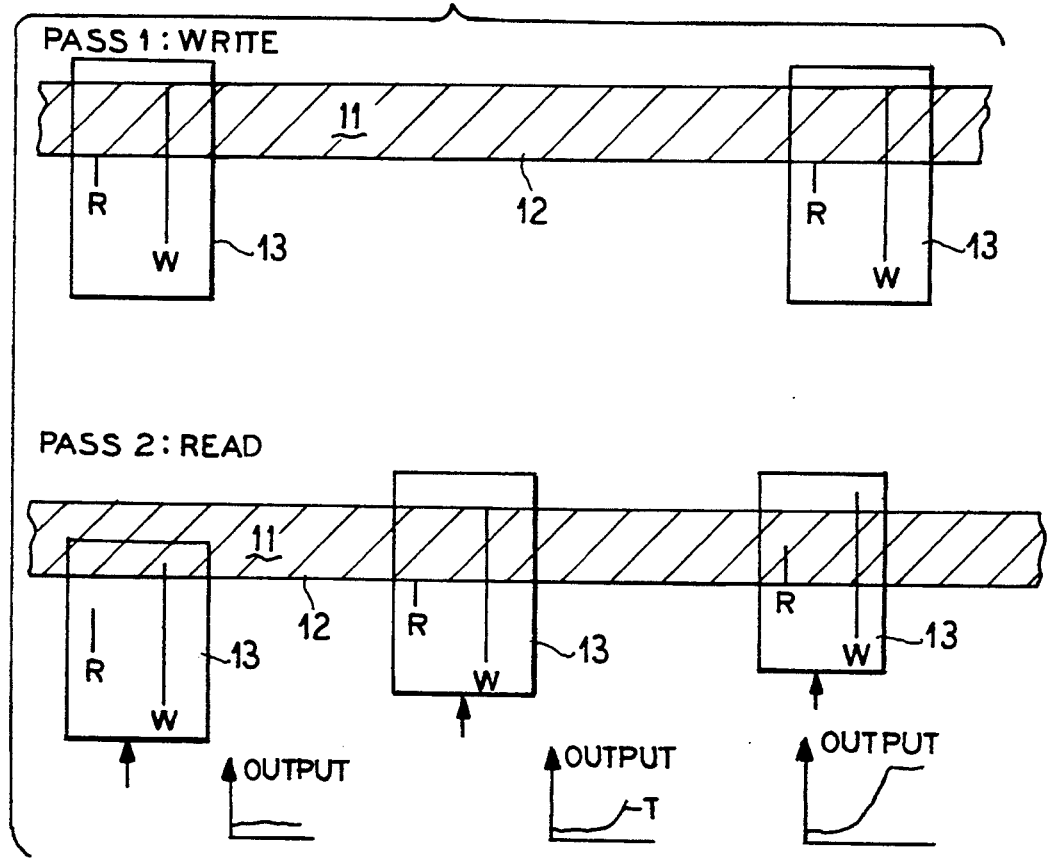

L0 = 100 STEPS
L1 = 80 STEPS

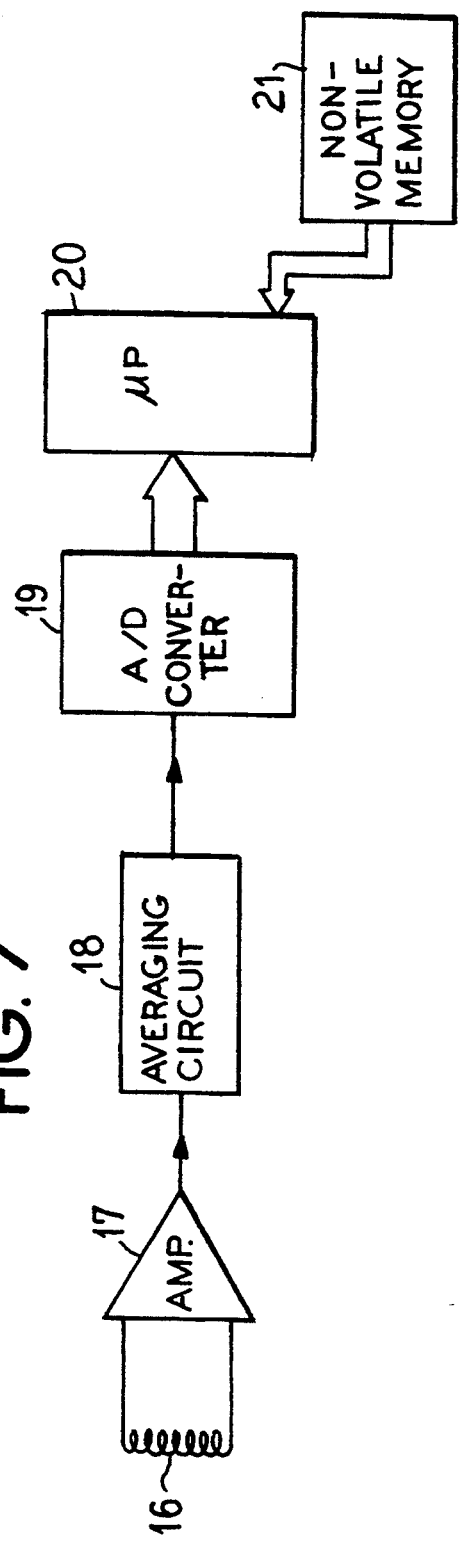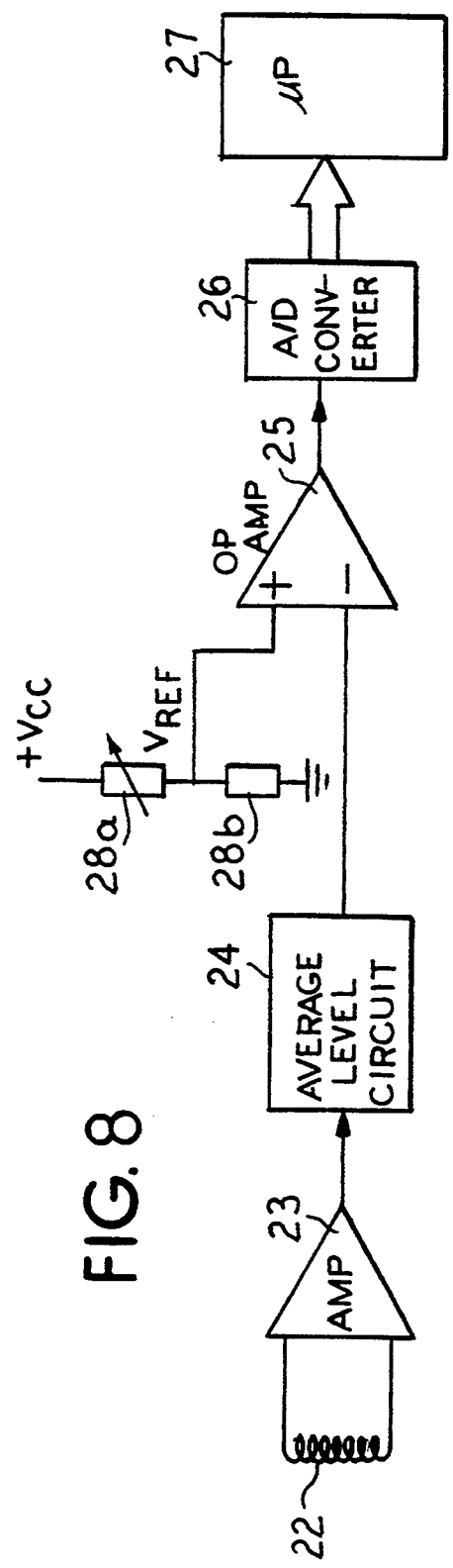

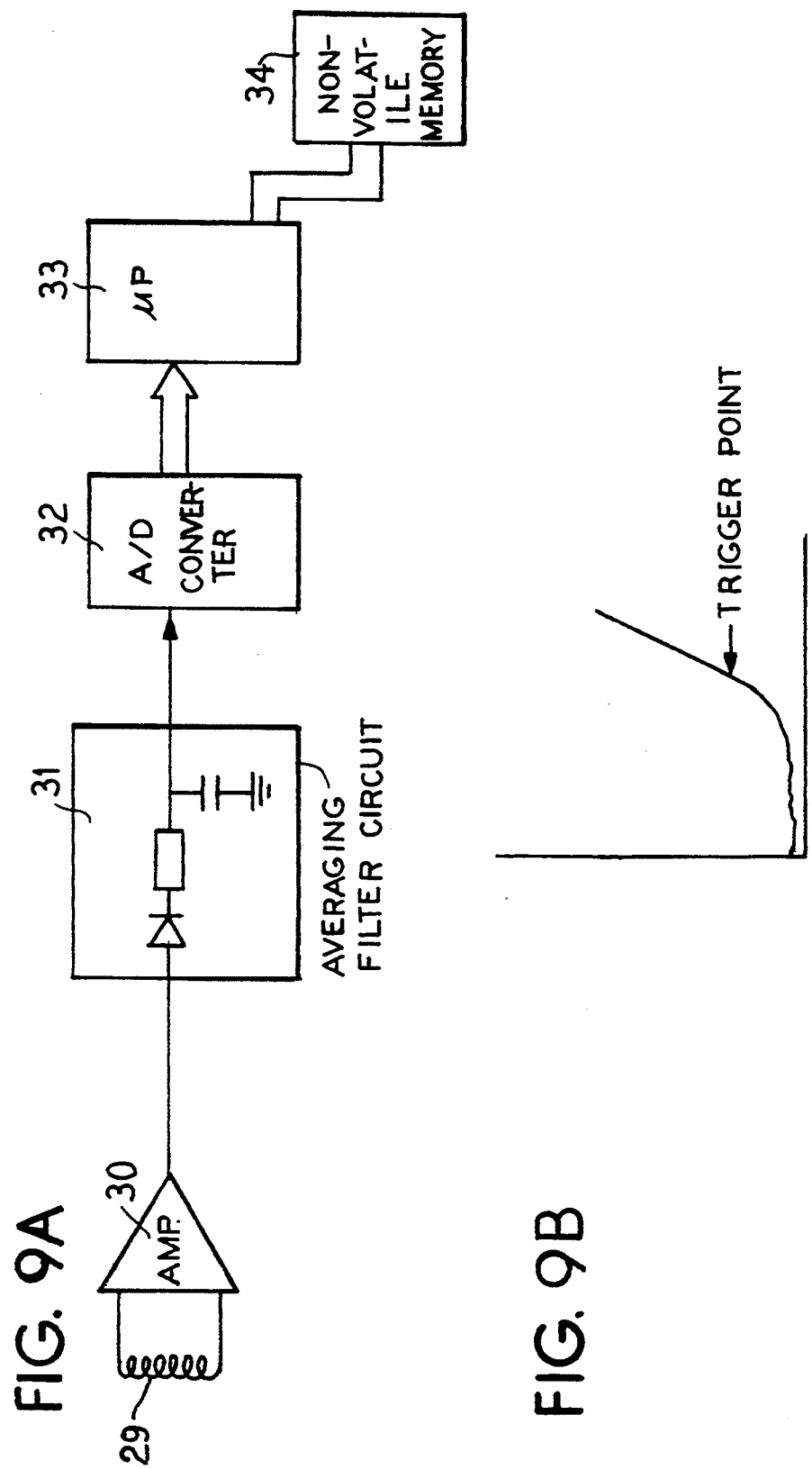

METHOD AND SYSTEM FOR TAPE EDGE SENSING

BACKGROUND OF THE INVENTION

To achieve high data capacity in data tape recorders, a high number of recorded tracks are desirable. For systems relying on longitudinal recording (recording along the length of the tape), knowing the position of one of the tape edges with a high accuracy is crucial. For years, this was achieved by making systems with very precise mechanical dimensions and narrow tolerances. However, as requirements increased, this method became more and more difficult (and expensive). It is therefore desirable to be able to detect the edge of the tape precisely without relying on a very expensive mechanical design.

U.S. Pat. No. 4,407,503, incorporated herein, teaches a method for detecting the edge of the tape by using the recording (read/write) head itself. This has proved to be a very efficient method used extensively, especially in the $\frac{1}{4}''$ tape cartridge industry, in order to effectively increase the number of recorded tracks. This can easily be verified by the following figures from the $\frac{1}{4}''$ tape cartridge industry: In 1984 the state of the art was 9 tracks across the tape. In just 7 years this had increased to 30 tracks without major improvements in the mechanical tolerances of the tape cartridges or the tape drives themselves.

In U.S. Pat. No. 4,407,503, the sensing of the edge of the tape is based upon writing a signal along the edge of the tape and then detecting this signal by a read head gradually moving from a position away from the tape towards the tape edge until it completely covers the edge of the tape (or vice versa: from a position known to be on the tape to a position off the tape). The writing and reading may be performed as one operation in a read-while-write mode (with a head containing both a read and a write element) or as a two pass operation where the head first writes along the edge of the tape and then reads the same signal during the next pass. It is possible to perform the write operation while moving a head 10 from a position 10A completely away from a tape 11 through positions 10B and 10C to a position 10D completely on the tape 11 (see FIG. 1) or (especially if the writing element W is much wider than the reading element R), the writing can be performed along a tape edge 12, while keeping the head 13 stable. In the latter case, the edge detection must be performed during a second pass when the head 12 is moved towards the tape 11 so that the read element can detect the signal along the tape edge 13. See FIG. 2.

When moving from a position off the tape 11 to a position on the tape 11, the output of the read head R will increase from almost zero level (noise) until a maximum value "M" when the whole read section of the head is covering the tape reading the recorded signal. This is shown in FIG. 3.

When designing an edge detection system, the system designer must pick a certain signal value as a triggering point ("pseudo edge"). This is referred to as "T" in FIG. 3. The designer may in theory pick any point on the curve of FIG. 3 as a reference point, though for many reasons it is common practice to pick T at somewhere between 15% and 30% of the maximum value ("M"=100%). If we assume that the maximum is 1 volt out of the read amplifier (M=1 volt), then T=20% means that the circuit is designed so that the electronics will trigger at 0.20 Volts. The designer will try to design the electronics to be very stable so that this triggering point "T" is not influenced by component variations, temperature changes, etc.

Once the triggering point "T" is selected in the design process, calculations and tests are used to determine the actual distance the read head has to travel on a typical drive and with a typical tape from the point where the head first touches the edge of the tape (approximately point "E" in FIG. 3) until it has reached point T. Once this distance is determined, the drive control system can move the head to any predetermined track position with a high degree of accuracy. Commonly a stepper motor is used to move the head. Therefore, all distances may be given as a specific number of steps of the stepping motor.

If we assume that the width of the read head section is equal to the distance travelled by the head in, for example 50 steps, then the distance "E" to "M" in FIG. 3 is equivalent to 50 steps and "E" to "T" is equivalent to 10 steps. FIG. 4 shows a typical track layout where the first track $I_0$ is placed nominally 100 steps from the edge 15 of the tape 14, and the following tracks $T_1$ and $T_2$ have a center-to-center line distance $L_1$ and $L_2$ of nominally 80 steps.

In calculating the nominal distance from the edge to the point on the tape 14 where trigger point "T" is reached (set to 10 steps in the example above), the designer will make calculations and verify the result by using a "typical" drive and tape in a nominal environment. Although tape may vary considerably, this method has been quite acceptable to meet the requirements up to the levels used in the industry today. For example, tape specifications typically allow for a variation in the tape output of −35% to +50% from the defined nominal 100% level. If we use the numbers in the example above, this means that the triggering point T will vary approximately from 6.7 steps minimum (with a +50% tape) to approximately 15.4 steps maximum (with a −35% tape). See FIG. 5. If the distance from the edge of the first track is 100 steps, this change in tape will introduce a track position error of a maximum of approximately 5%. For most systems, this is acceptable.

To reduce the variation due to tape output tolerances, some designers have designed the electronics so that the read detection amplifiers have a very high amplification (gain). Therefore, the output from the read amplifier will increase very rapidly even at very low signal levels. The amplifier will saturate long before the nominal head output is reached. This will reduce the effect of tape output variations. See FIG. 6.

This method has the drawback that the noise in the system also will be amplified in the same way. Therefore, the triggering point must be set at a very high level, reducing the effectiveness of the method.

U.S. Pat. No. 4,977,468, incorporated herein, teaches another method to overcome variations in tape output by using two read heads. The signal from one of the read heads is compared by a comparator to the output signal from the other one. The operation starts by having both read heads covering a portion of the tape which contains a recorded signal. The heads are then gradually stepped away from the tape. As the first read head moves away from the tape, the read signal from this head will drop and the comparator circuit will trigger. Since the comparator is comparing the output signals from both read sections, variations in tape output will be the same for both outputs and therefore not influence the comparator (common mode rejection).

As mentioned, tapes used in the industry today may, according to the specifications, vary in output from −35% to +50%. These specifications are for the tape at the time of first recording. During use, tape output will be reduced, especially in areas which often pass over the read head.

For most tape systems, that means the Beginning Of Tape (BOT) area, which also is the area typically used to determine the edge of the tape. Therefore, on a used tape, output levels may be less than specified −35% from nominal value. Variations in temperature may reduce the level even more. This obviously makes edge detection less precise.

Until now, the method taught in U.S. Pat. No. 4,407,503 has met the requirements for track accuracy used in the industry, even with the variations in the tape outputs referred to above. However, as capacity requirements continue to grow, even more precise methods to find the edge of the tape is required, so that track densities can be increased further.

The method taught in U.S. Pat. No. 4,977,468 has so far been the only described method to further improve the edge sensing operation based upon U.S. Pat. No. 4,407,503. The method defined in U.S. Pat. No. 4,977,468 will improve the edge sensing tolerances; however, the cost of the dual read head design is significant and should be avoided if possible.

SUMMARY OF THE INVENTION

It is an object of this invention to achieve a significant improvement in the accuracy of the edge sensing operation, without the requirement of a dual read head system.

It is also an object of the present invention to avoid the problems of the prior art wherein a main source for inaccuracy of the edge sensing technique is the variation in output signal level from tape to tape. This variation is due to manufacturing methods and tolerances, environmental influences (especially temperature), and tape wear. Output reductions due to tape wear may be quite significant with a worn tape. Even storing a tape for a long time may affect its performance significantly.

To avoid these problems, the present invention teaches the tape drive about the particular tape being used before the edge sensing operation is performed. Information from this learning process is then used to correct the result of the edge sensing operation by compensating for tape output variations.

According to the invention, the 100% output level of a nominal tape is determined by placing the nominal tape in the tape drive to be calibrated and writing on the tape with a given write current used for calibration and measuring the output from the read head. Then, for determining an edge of a given tape being subsequently used, first writing on the tape with the same head and using the same write current as was used for the calibration procedure with a nominal tape, and then reading the recorded signal with the same read head system used during the calibration procedure. The output from the read head is then used to determine a correction factor based on the output resulting from the nominal tape compared to the output from the given tape being used. The correction factor is then used to modify a triggering point which is used when detecting the edge of the given tape.

BRIEF DESCRIPTION OF THE DRAWINGS

FIG. 1 is a diagram illustrating tape edge sensing with corresponding read head outputs in accordance with a prior known system for determining the edge of a tape;

FIG. 2 illustrates an alternate known system for detecting the edge of a tape, including corresponding outputs for the read head;

FIG. 7 illustrates a first embodiment for accomplishing a first step according to the invention wherein output from a nominal tape is memorized and wherein an actual output level from a tape is compared to a 100% reference value to create a correction factor;

FIG. 8 shows an alternate embodiment of a first step of the invention to determine an output correction factor for a particular tape;

FIG. 9(A-B) show a first embodiment for performing a second step of the invention wherein a trigger point for detecting a tape edge is corrected according to the previously determined correction factor;

DESCRIPTION OF THE PREFERRED EMBODIMENTS

Figure 3:
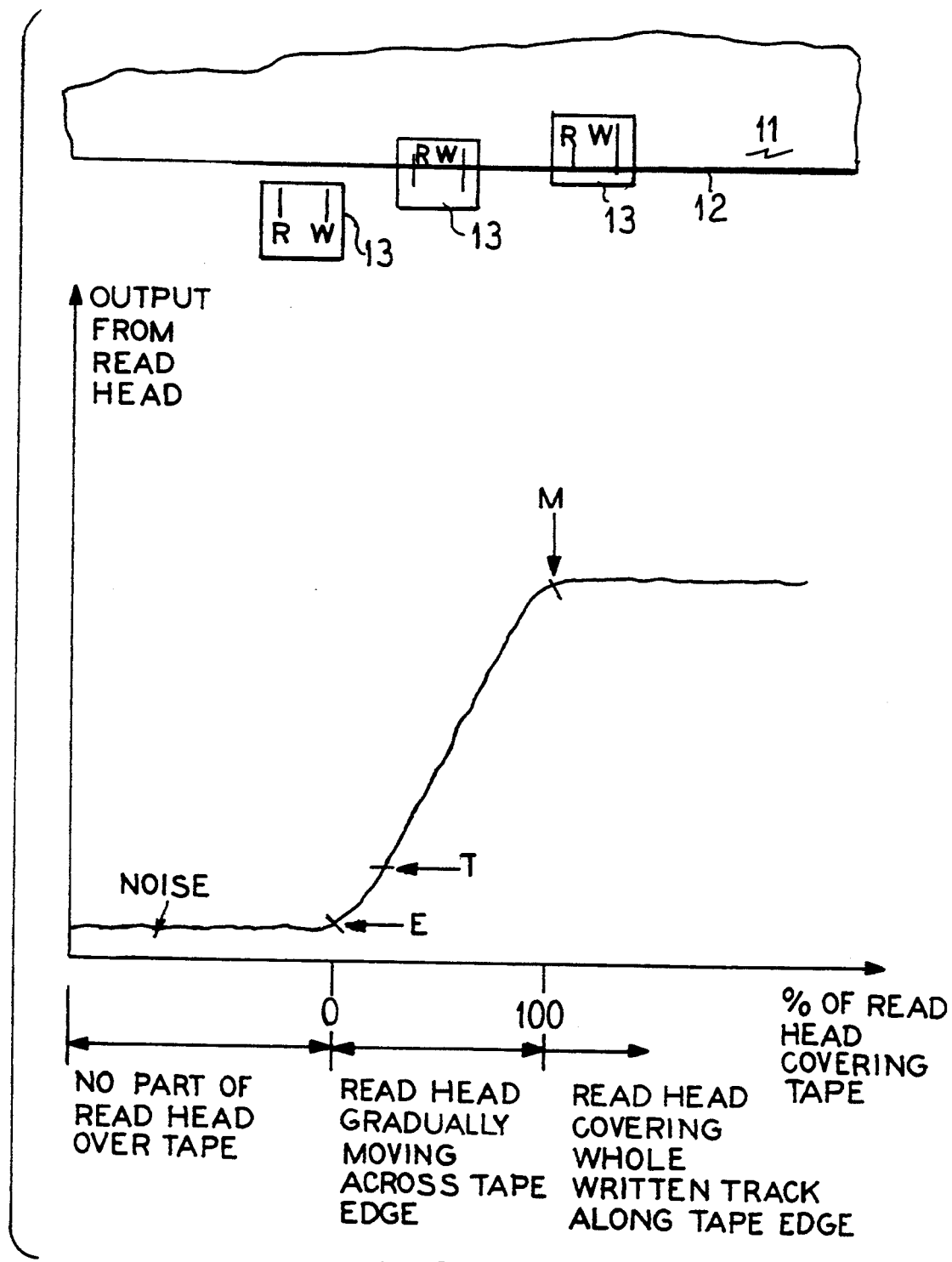
FIG. 3 illustrates selection of a triggering point in a known system for detecting a tape edge.
Figure 4:
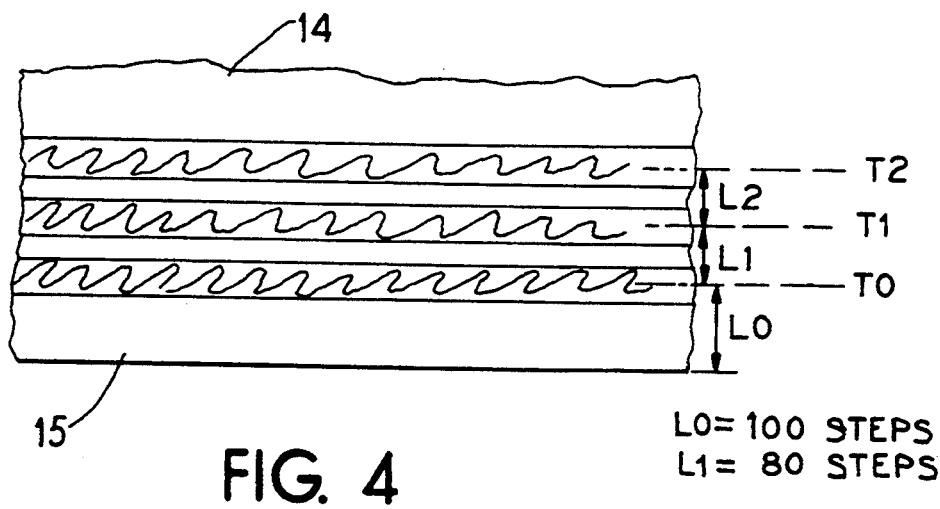
FIG. 4 shows a typical track layout having a plurality of tracks and their spacing from a tape edge.
Figure 6:
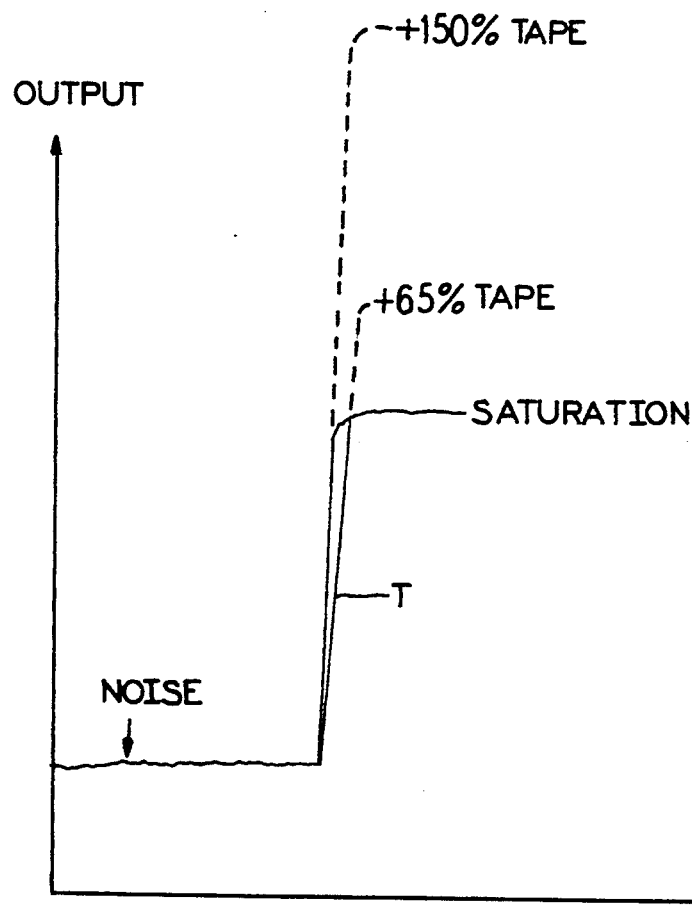
FIG. 6 shows a graph illustrating a design wherein read detection amplifiers have a very high amplification to reduce variation due to tape output tolerances such that the amplifier will saturate before a nominal head output is reached, said system also amplifying noise in the system and requiring a high level triggering point.
Figure 5A:
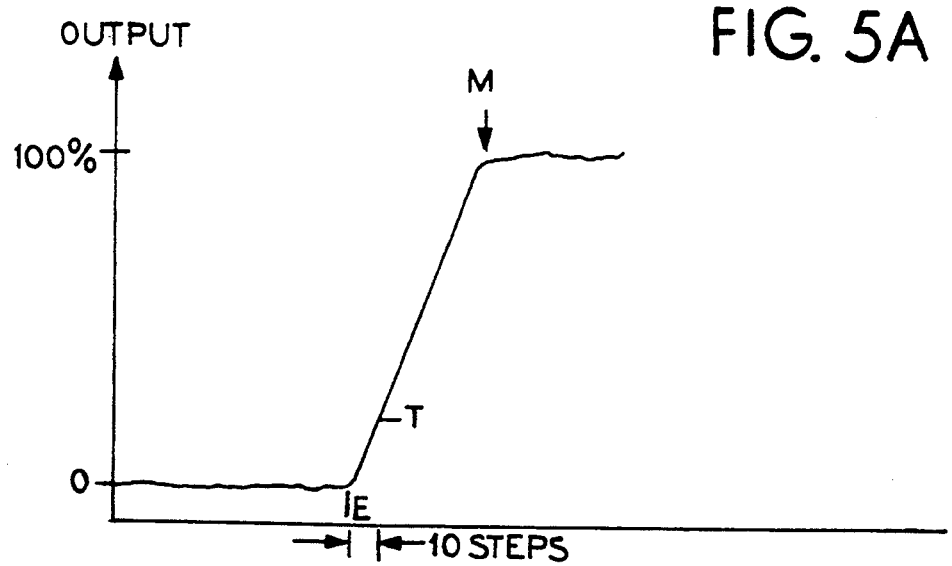
FIG. 5(a-c) are a graphical illustration showing a change of a triggering point depending upon a variation in tape output.
Figure 5B:
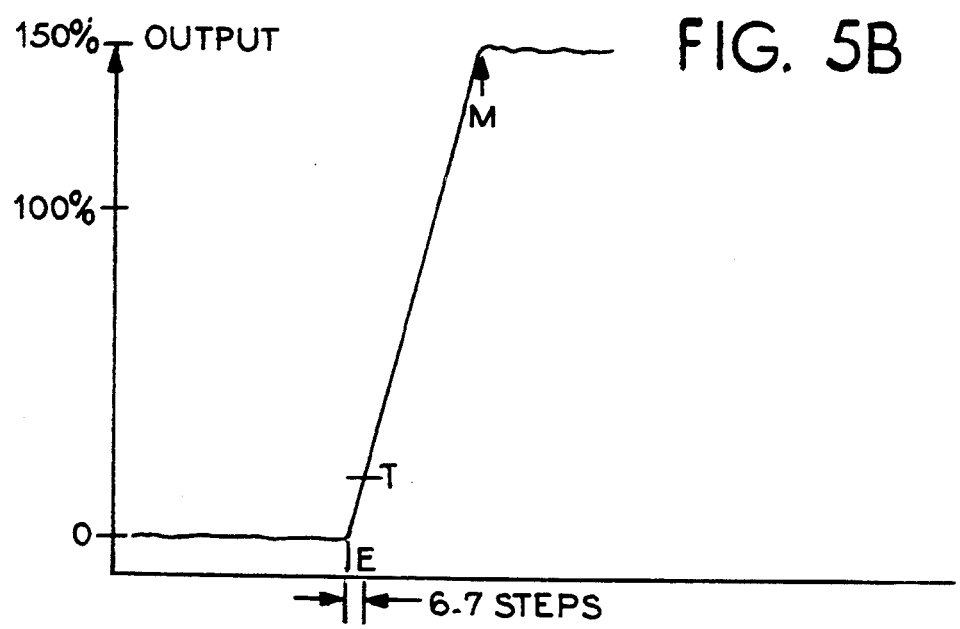
Figure 5C:
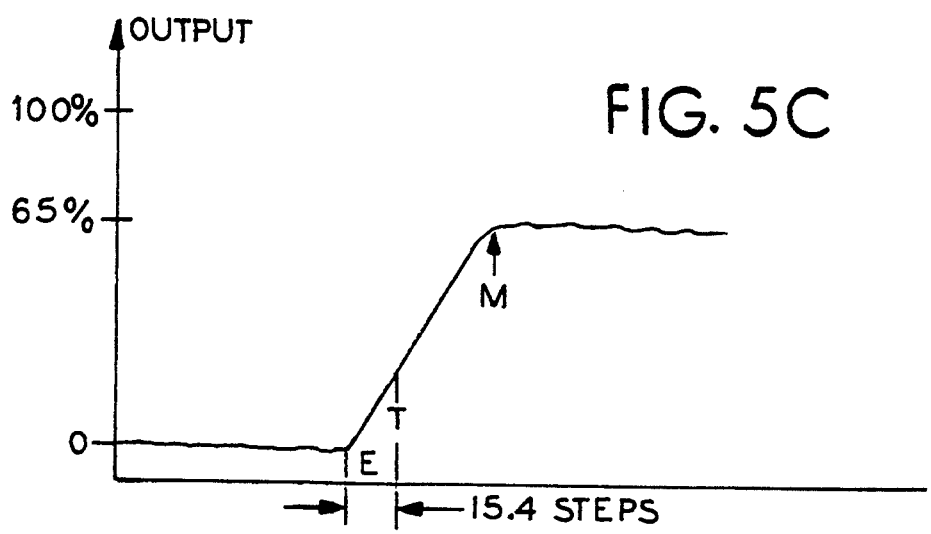

The method of the invention can be described as a series of steps.

The first step, learning about the tape output, is performed as follows.

The drive positions the read/write head so that it is on (over) the actual or given tape to be used in the process. The exact position is not critical, but the head should be in the same nominal area of the tape where the edge sensing operation later shall be performed (typically the BOT area).

The drive shall then perform a write operation by writing a short portion of a track using the same write head and the same write current as it will use later during the edge sensing operation. Once the portion of the track is recorded, the drive shall determine the output level of the recorded signal. Depending upon the head construction, this may be done during the same pass as the write operation (head containing independent write and read sections for the same channel (Read-while-Write configuration)) or during a second pass (head contains a combined read/write section).

The drive determines the actual output level of the recorded signal and correlates this level to a reference level determined when recording on a "nominal" tape (100% output level). This reference level is established earlier, typically during the production of the drive. This may be done in several different ways.

FIG. 7 shows one design where the output of a read head amplifier 17 connected to a read head 16 is rectified and filtered to reflect an average value of the signal (here indicated as averaging circuit 18), and this signal is then connected to an A/D converter 19; and the output from the A/D converter is fed to the drive's microprocessor or micro controller 20. At a specified time, typically during production, the drive performs a write operation on a tape known to be a nominal 100% output tape. The write current level and the write head itself shall be the same as is later used to determine the output from individual tapes. The drive then reads this recorded signal, defined to represent the 100% output level. The read head and the read channel shall also be the same as is used later during reading of individual tapes. The actual 100% reference level for a particular drive is stored permanently in the drive's microprocessor system using a non-volatile memory 21. The storage memory 21 may be a ROM, an EPROM, a PROM or a non-volatile RAM like an EEPROM or a flash memory or a RAM with a permanent voltage supply.

After this first learning process, the drive and its microprocessor will know what the level from a standard "100%" tape is. When it later performs this operation on an unknown tape, it will determine the actual output level from this tape and compare it to the "100%" reference value. It will then create a correction factor used in the following edge sensing operation. Example: If the output from the read amplifier using a nominal "100%" tape is 1 volt, and the output from the unknown tape is 0.5 volts, the correction factor will be $$\frac{\text{Measured value}}{\text{Nominal value}} = \frac{0.5 \text{ volt}}{1 \text{ volt}} = 0.5$$

FIG. 7 shows only one method which may be used to detect the actual output from the read head and amplifier to determine the correction factor. FIG. 8 shows another method. The nominal 100% head output value is measured during the production of the drive and a voltage divider chain 28a,b is adjusted so that voltage $V_{ref}$ corresponds to the nominal output value. This voltage is fed to one of the inputs of an op. amp. 25. The output from the head 22 and amp 23 is rectified and filtered (indicated by average level circuit 24) and fed to the other input of op. amp. 25. The output of the op. amp. 25 will therefore correspond to a correction factor. A microprocessor 27 can then, through a simple A/D converter 26, measure this value and use it in the following edge sensing operation.

FIGS. 7 and 8 describe only two possible methods to find the correction factor for a particular tape. Those skilled in the art may easily find other methods. The only requirement is that it shall be possible to determine a correction factor based upon measuring the output from the tape being used and comparing it with the output from a tape defined as a nominal 100% output tape. This correction factor will then be used in the following operation (step two).

Figure 11A:
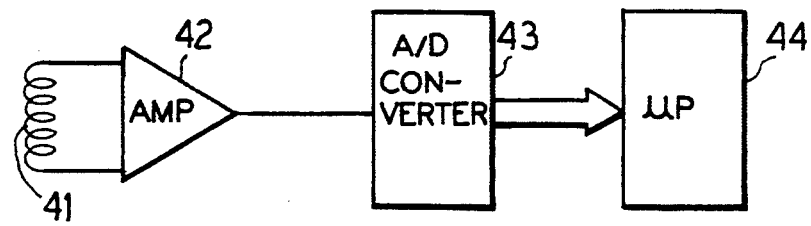
FIGS. 11A and 11B show alternate embodiments for a filter design for the filters of FIGS. 9 or 10.
Figure 11B:
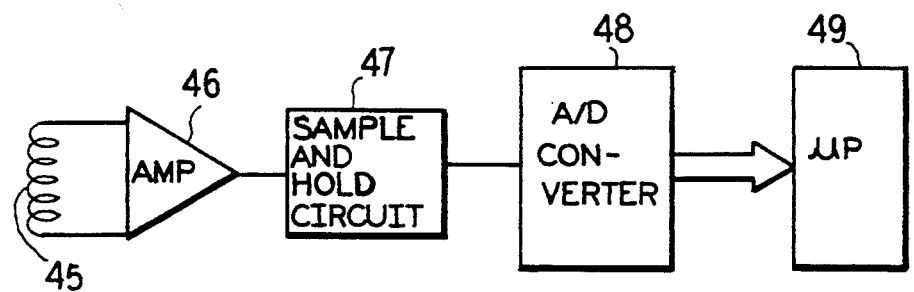

The filtering of the read signal may vary according to the actual design requirements. It may also be possible to use no special filters or a sample and hold system as shown in FIG. 11, described hereafter.

Step two involves an adjustment of the circuit employed to detect the triggering point "T" in FIG. 3. The idea is to adjust this point according to the correction factor, so that the actual triggering point occurs at the same physical distance from the edge of the tape, regardless of the maximum tape output.

This can be achieved in many ways. FIG. 9 describes one possible method. As shown in the Figure, the output from the head amplifier 30 connected to head 29 is rectified and filtered (in averaging filter circuit 31) and is then connected to an A/D converter 32. This converter is connected to a microprocessor 33. The A/D converter 32 informs the microprocessor 33 about the actual signal level during the edge seek operation when the head is stepped from a position fully outside the tape to a position fully on the tape. The microprocessor 33 is programmed to detect the triggering point "T" at a certain voltage level when a standard 100% output tape is used. For example, if "T" is defined at 0.2 volts on a 100% tape, the microprocessor 33 will read the output from the amplifier via the A/D converter 32 and trigger when the signal reaches the 0.2 volt level.

When performing this operation on another tape (with an output value which differs from 100%), the microprocessor will know the correction factor for the particular tape (from step 1) and calculate a corrected "T" value based upon the correction factor. For example, if the correction factor is 0.5 and the nominal "T" value is 0.2 volts, then the microprocessor for this particular tape calculates a corrected "T" value to be 0.2 (0.5)=0.1 volts. This means that for this particular tape, the microprocessor will trigger when the read head has travelled so far over the edge of the tape that the output from the head amplifier has reached 0.1 volts. The physical distance the read head has travelled from the edge of this tape will then be the same as if it has used the 0.2 volt triggering point on a nominal 100% output tape.

Figure 10:
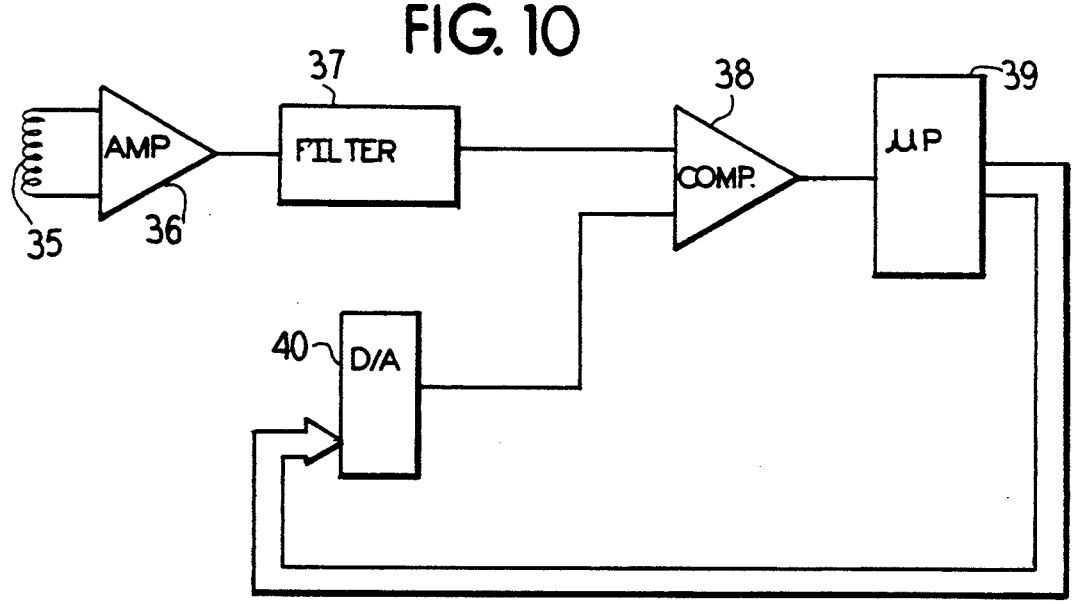
FIG. 10 is an alternate embodiment for modifying the trigger point for determining a tape edge according to the previously determined correction factor.

FIG. 10 shows another method where the rectified and filtered signal from the read amplifier 36 connected to read head 35 is fed to a comparator 38 through filter 37. The other input to the comparator 38 is an adjustable voltage reference circuit. This voltage is adjusted by the microprocessor 39 according to the correction factor found in step 1. In FIG. 10 this adjustment is performed by setting a value on a D/A converter 40. The output of the converter 40 represents the reference voltage and corresponds to the corrected trigger value for the particular tape as described above. If, for example, the nominal triggering point (using a 100% tape) is defined to be 0.2 volts and the correction factor was found to be 0.5 in step 1, the voltage reference shall be adjusted to 0.1 volts (0.2) 0.5=0.1 so that the comparator 38 will trigger at 0.1 volts for this particular tape.

As already mentioned for FIGS. 7 and 8, the actual filter design may vary according to the particular requirements of the drive. The designs shown in FIGS. 11A and 11B may also be implemented as part of FIGS. 9 or 10. Here the filtering operation is performed digitally by the microprocessor (49 or 44).

Those skilled in the art may design similar circuits performing the same task: a circuit designed to detect the voltage output from the read amplifier and trigger at a certain level, this level being possible to modify according to the correction factor detected during step 1 (tape output detection operation).

Once the trigger circuit is set to a correct value for the particular tape, the tape drive can perform the actual edge sensing operation as described in U.S. Pat. No. 4,407,503. A main difference over U.S. Pat. No. 4,407,503 is that the actual triggering point is not fixed, but is individually set for each tape. This will improve the accuracy of the whole operation. Compared with U.S. Pat. No. 4,977,468, the method described here can be utilized without any changes to the head and with minimum changes to the electronics. Thus, this method is far more cost-effective, compared to the method described in U.S. Pat. No. 4,977,468.

For systems having a high number of tracks, this accuracy improvement is significant. For example, let us assume a ¼" tape cartridge system having 44 tracks on the tape, where the distance between the center line of two neighboring tracks is equivalent to 28 steps. The width of the read head corresponds to 18 steps. This is equivalent to the 100% output level from the head. The distance from the edge of the tape to the center line of the first track is set to 36 steps. If we assume that a nominal 100% tape has an output of 1 volt and the nominal trigger point "T" is set to 0.222 volts, this means that the trigger point "T" on a nominal tape corresponds to (18) 0.222=4 steps.

Since half of the read head corresponds to 9 tracks, the system on a nominal 100% tape shall step an additional (36−4)+9=41 steps before it is correctly positioned at the centerline of the first track and may begin the write operation.

If we now assume a tape with a nominal output voltage of 0.5 volts, the triggering at the 0.222 volt level occurs after (0.222/0.5)(18)=8 steps if no correction for tape output variation is performed. The drive adds 41 more steps before starting the write operation. Thus, the first track is recorded at a centerline position equivalent to 40 steps instead of 36, corresponding to an error of 11%. Each track center line will be off 4 steps, corresponding to an error of 14%. These errors are quite significant.

A drive using the new principle described here, will operate with a correction factor of 0.5 for the particular tape just mentioned. The trigger point will therefore be adjusted to 0.222(0.5)=0.111 volts which, with this tape, will happen after (0.111/0.5)(18)=4 steps, which is the same as for the standard nominal tape. Thus, with this correction system, the track positions will not be influenced by variations in tape output.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for detecting an edge of a given tape by use of a write head and read head on a tape drive, comprising the steps of:
   determining a nominal trigger point of an output signal from the read head at which a tape edge is to be detected;
   providing a nominal reference tape which will provide a reference output signal when written on;
   by using the tape drive, writing on the reference tape during a calibration procedure with a given write current and measuring and storing a resulting reference output signal derived from the read head;
   playing the given tape in the tape drive and writing on the tape with the same write current as was used during the calibration procedure and with the same write head, and reading a resulting output signal with the same read head;
   comparing the output signal from the given tape with the reference output signal derived during the calibration procedure and creating a correction factor based thereon; and
   applying the correction factor to the trigger point, writing a signal with the write head at the tape edge, moving the read head across the tape edge and detecting a resulting output signal with the read head, and determining the tape edge for the given tape by utilizing the read head output signal and determining when the trigger point with the correction factor applied thereto has been attained.

2. A method according to claim 1 including the steps of forming the correction factor as a ratio wherein the given tape output signal is the numerator and the reference tape output is the denominator, and multiplying the ratio times the trigger point.

3. A method according to claim 1 wherein the read head and write head are in the same tape head and the reading occurs during the calibration procedure as the writing is also occurring.

4. A method according to claim 1 wherein during the calibration procedure, first a signal is written by the write head on the reference tape and during a subsequent pass the signal is read by the read head.

5. A method according to claim 1 wherein when finding the edge of the tape, a tape head having both the write head and read head thereon is steadily moved from a position off the tape across the tape edge onto the tape, and wherein the edge determination occurs when the output signal from the read head attains the corrected trigger point.

6. A method according to claim 1 wherein when finding the edge of the tape, the write head first writes a signal along the edge of the tape, and thereafter the read head is steadily moved from a position off the tape across the tape edge onto the tape.

7. A method according to claim 1 wherein when determining the resulting output signal for comparison with the reference output signal, writing on the tape in a same region as is written on later when determining the tape edge.

* * * * *